2,958,701
MONO-DECARBOXYLATION OF TRIMELLITIC ACID ANHYDRIDE

Art C. McKinnis, Long Beach, Calif., assignor to Union Oil Company of California, Los Angeles, Calif., a corporation of California No Drawing. Filed Mar. 6, 1959, Ser. No. 797,568

6 Claims. (Cl. 260—346.7)

This invention relates to methods for the manufacture of o-phthalic anhydride by the mono-decarboxylation of trimellitic acid anhydride, as follows:

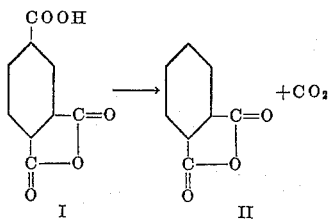

Briefly, the method consists in heating trimellitic acid, or its inner anhydride (I), at a temperature between about 250° and 375° C. in the substantial absence of water and in the presence of a catalyst comprising a copper or silver salt. Preferred temperatures lie in the range from about 285° to 350° C., for at these temperatures, the phthalic anhydride is continuously vaporized as formed and may hence be easily separated from the catalyst and unreacted material. Temperatures above about 375° C. result in competing reactions such as the formation of intramolecular anhydrides of trimellitic acid, which are not readily decarboxylated.

The bulk of the phthalic anhydride of commerce is now manufactured by the oxidation of naphthalene. However, this process gives rise to a complex mixture from which pure phthalic anhydride is difficultly obtainable. Moreover, the yields are relatively low. According to my invention, pure phthalic anhydride is easily obtained in substantially 100% yields from a raw material (trimellitic acid) which is readily obtained by the oxidation of pseudocumene.

As indicated in the above equation, the immediate precursor of phthalic anhydride is the inner anhydride of trimellitic acid (I). However, this anhydride is readily formed when trimellitic acid is heated at temperatures above about 220° C. Hence, the starting material in the process may be either trimellitic acid or the anhydride.

The effect of the catalyst in my process is highly specific and critical. In the absence of a catalyst, little or no decarboxylation occurs at the operative temperatures here concerned. At higher temperatures, any decarboxylation which may occur is slow and non-selective, and the resulting product is a complex mixture containing little if any phthalic anhydride. The operative catalysts are the salts and oxides of copper and/or silver. Suitable salts include for example, cupric acetate, cupric sulfate, cupric naphthenate, cupric trimellitate, cupric chloride, cupric nitrate, cupric bromide, cupric formate, cupric sulfide, silver acetate, silver benzoate, silver sulfate, silver naphthenate, silver trimellitate, silver chloride, silver nitrate, silver oxalate, silver sulfide, etc. Cuprous salts may also be employed. Any amounts of catalyst are operative to some extent, but preferably amounts between about 0.001% and 2% by weight, based on trimellitic anhydride, are used.

Other metal salts, including salts of nickle, mercury, manganese, and zinc have been tried, but were found to have little or no effect.

The substantial absence of water during reaction is essential to the process. If water is present, little if any phthalic acid, or phthalic anhydride is obtained, the product consisting almost wholly of a mixture of isophthalic and terephthalic acids. However, water in the starting material is not harmful, since at atmospheric pressure, substantially all water is vaporized before reaction temperatures are reached.

The process is ordinarily carried out at atmospheric pressure, but reduced or increased pressures may be used if desired. Both batch-wise and continuous operations are contemplated. In batch operations, the trimellitic acid or anhydride is placed in a suitable vessel along with the catalyst, and gradually heated to reaction temperature. A molten reaction mass forms, and if the catalyst is insoluble agitation may be desirable, but is ordinarily unnecessary. Vaporized phthalic anhydride is continuously removed and condensed until all or substantially all the trimellitic anhydride is consumed. In continuous operations, trimellitic acid or its anhydride is added continuously or incrementally to the reaction vessel. The catalyst remains effective substantially indefinitely.

The following examples are cited to illustrate the invention, but should not be considered limiting in scope:

EXAMPLE 1

To a 100 ml. flask was added 25 gms. of trimellitic acid anhydride and 0.1 gm. of cupric acetate. The flask was heated at 320° C. for ten minutes, and the vaporized phthalic anhydride was continuously collected in an air-cooled condenser. The product was over 99% pure and was obtained in 96% yield.

EXAMPLE 2

To compare the effectiveness of various catalysts, several 25 gm. samples of trimellitic anhydride were heated with 0.2 gm. of catalyst, and the volume of $CO_2$ evolved over the ten minute heating period was measured. The temperature was 345° C. in all cases except runs 1 and 2, in which the evolution of $CO_2$ and phthalic anhydride was so rapid that lower temperatures were necessary. The results were as follows:

Table 1

| Run No. | Catalyst | Liters $CO_2$ evolved | Calculated percent conversion, at 305° C. and 10 minutes |
|---|---|---|---|
| 1 | Cu(acetate)$_2$ | a 2.46 | 50 |
| 2 | AgNO$_3$ | b 1.11 | 45 |
| 3 | Ni(NO$_3$)$_2$ | 0.44 | 2 |
| 4 | Hg(NO$_3$)$_2$ | 0.17 | 0.5 |
| 5 | Mn(acetate)$_2$ | 0.05 | 0.5 |
| 6 | Zn(acetate)$_2$ | 0 | 0 |
| 7 | AuNO$_3$ | 0 | 0 | a This sample heated 30 minutes at 280–305° C.
b This sample heated 10 minutes at 319° C.

The marked specificity of copper and silver salts is readily apparent.

It is not intended that the invention should be limited to the details described above. Other salts of copper or silver function in substantially the same manner. The true scope of the invention is intended to be embraced by the following claims.

I claim:

1. A process for the manufacture of phthalic anhydride which comprises heating a material selected from the class consisting of trimellitic acid and trimellitic acid anhydride at a temperature between about 250° and 375° C. in the substantial absence of water and in the presence of a catalyst selected from the class consisting of the oxides and salts of copper and silver, and recovering phthalic anhydride therefrom.

2. A process as defined in claim 1 wherein said catalyst is copper salt.

3. A process as defined in claim 1 wherein said catalyst is silver salt.

4. A process for the manufacture of phthalic anhydride which comprises heating a material selected from the class consisting of trimellitic acid and trimellitic acid anhydride at a temperature between about 285° and 350° C. in the substantial absence of water and in the presence of a catalyst selected from the class consisting of the oxides and salts of copper and silver, and continuously removing vaporized phthalic anhydride from the reaction mixture.

5. A process as defined in claim 4 wherein said catalyst is copper salt.

6. A process as defined in claim 4 wherein said catalyst is silver salt.

No references cited.